United States Patent

Fuller et al.

[11] Patent Number: 6,101,430
[45] Date of Patent: Aug. 8, 2000

[54] GLOBAL POSITIONING SYSTEM SELF CALIBRATION ATTITUDE DETERMINATION

[75] Inventors: Richard A. Fuller, Los Gatos; John J. Rodden, Los Altos, both of Calif.

[73] Assignee: Space Systems/Loral, Inc., Palo Alto, Calif.

[21] Appl. No.: 09/144,146

[22] Filed: Aug. 31, 1998

Related U.S. Application Data

[60] Provisional application No. 60/059,092, Sep. 16, 1997.

[51] Int. Cl.$^7$ ........................................ G05D 1/08
[52] U.S. Cl. .................... 701/13; 701/215; 342/357.11
[58] Field of Search ........................... 701/13, 213, 215; 342/357.11, 357.12

[56] References Cited

U.S. PATENT DOCUMENTS

| | | | |
|---|---|---|---|
| 5,296,861 | 3/1994 | Knight | 342/357 |
| 5,506,588 | 4/1996 | Diefes et al. | 342/357 |
| 5,548,293 | 8/1996 | Cohen | 342/357 |
| 5,831,572 | 11/1998 | Damilano | 342/352 |
| 5,850,197 | 12/1998 | Schipper | 342/417 |
| 5,929,805 | 7/1999 | Tadros et al. | 701/214 |

OTHER PUBLICATIONS

Johnson, W.; Attitude adjustment: GPS innovation keeps satellite oriented; Satellite Communications; vol. 19, iss. 6; Jun. 1995.

Primary Examiner—Michael J. Zanelli
Attorney, Agent, or Firm—Perman & Green, LLP

[57] ABSTRACT

An improved GPS Attitude Receiver for spacecraft uses concurrent line-bias estimates derived from GPS signals for attitude determination. Attitude determination is obtained from GPS measurements by an interactive solution of the known "Attitude Master Equation", using RF differential phase measurements and calibrated parameters of baseline vectors and line-biases. A "weighted fit error" W, is derived from the sum squared of discrepancies between predicted and actual measurements, weighted by measurement variances. By minimizing W, the line-bias estimations obtained give more current data including thermal effects and eliminate separate ground calibration tests.

9 Claims, 3 Drawing Sheets

GLOBAL POSITIONING SYSTEM SELF CALIBRATION ATTITUDE DETERMINATION

CLAIM OF PRIORITY BASED ON PROVISIONAL APPLICATION

The present application is related to now abandoned Provisional patent application Ser. No. 60/059,092 of RICHARD A. FULLER and JOHN J. RODDEN, filed Sep. 16, 1997, entitled "GLOBAL POSITIONING SYSTEM SELF CALIBRATION ATTITUDE DETERMINATION", and based on which priority is herewith claimed under 35 U.S.C. 119(e) and the disclosure of which is incorporated herein by reference in its entirety.

BACKGROUND OF THE INVENTION

1. Field of the Invention

The present invention relates to spacecraft attitude determination systems and more particularly to a system that provides pitch, roll, and yaw attitude control for an orbiting satellite using Global Positioning System (GPS) signals as input during operation.

2. Prior Art

A major issue encountered during the development of a suitable GPS Attitude Receiver for spacecraft is the need for accurate estimates of the electrical delay properties of the system, such as phase lag in the connecting cables between the antenna and receiver, which delays are referred to as "line-biases".

Existing works relating to the GPS, include:

1) KNIGHT, D., "A New Method of Instantaneous Ambiguity Resolution", Presented at the Institute of Navigation 7th International Technical Meeting, Salt Lake City, Utah, Sep. 20–23, 1994;
2) COHEN, C., "Attitude Determination Using GPS.", Ph.D. Dissertation, Stanford University, December 1992;
3) PARKINSON, B., ET AL, ed., "Global Positioning System: Theory and Applications", Vols. I and II, American Institute of Aeronautics and Astronautics, 1996; and
4) BROCK, J. K., ET AL, "GPS Attitude and Orbit Determination for Space", ION GPS-94 Conference Proceedings, Salt Lake City, Utah, Sep. 20–23, 1994.

These articles have presented some approaches for estimating the line-biases for a stationary platform, that offer satisfactory solutions if a suitable test is possible and the line-biases do not change over time. However, as several situations can occur where the test is not possible or the line-biases can be expected to change significantly over time, such as due to changing thermal conditions, these approaches are somewhat limited.

Other articles of interest regarding the GPS in the prior art are:

5) BROCK, J. K., ET AL, "GPS Attitude Determination and Navigation Flight Experiment", ION GPS-95 Conference Proceedings, Palm Springs, Calif., Sep. 12–15, 1995;
6) FULLER, R. A., ET AL, "Spacecraft Guidance and Control with GPS Tensor", Presented at 19th Annual AAS Guidance and Control Conference, Breckenridge, Colo., Feb. 7–11, 1996; and 7) FULLER,R. A., ET AL, "GPS Attitude Determination From Double Difference Differential Phase Measurements", ION GPS-96 Conference Proceedings, Kansas City, Mo., Sep. 17–20, 1996.

It will be seen, however, upon studying all of the foregoing literature, that none involves an approach that would produce concurrent generation of attitude parameters, and particularly none using differential phase measurements obtained from an antenna array while performing phase calibration and reliably estimating attitude system line-biases.

Problem to be Solved

It is accordingly a problem in the art to accurately estimate attitude system line-biases and achieve an approach that is effective for concurrent generation of attitude using differential phase measurements obtained from an antenna array while performing phase calibration.

Objects of the Invention

It is therefore an object of the present invention to provide a method and means for producing concurrent generation of attitude using differential phase measurements obtained from an antenna array while performing phase calibration.

It is also an object of the invention to provide a novel approach for accurately estimating attitude system line-biases in performing the phase calibration.

SUMMARY OF THE INVENTION

The present invention involves a method and means for significantly extending the usefulness of systems that accomplish attitude determination using signals from the Global Positioning System (GPS), such as a system using the technique described in the above-noted technical paper 1) by D. KNIGHT, "A New Method of Instantaneous Ambiguity Resolution", and particularly the invention provides an improved GPS Attitude Receiver for spacecraft. In contrast to the prior art pre-calibration, fixed parameter, "Self-Survey" technique developed by C. COHEN and described in the above-noted technical paper 2), attitude determination from GPS measurements are obtained by an interactive solution of the known "Attitude Master Equation", set forth below, using RF differential phase measurements and calibrated parameters of baseline vectors and line-biases. Baselines can be determined mechanically, but line-biases require special calibration, and line-biases in orbital operation are utilized on a nearly continuous basis. Consequently, estimating line-biases accurately in a spacecraft GPS Attitude Receiver poses a considerable challenge, and the present invention is designed to generate concurrent accurate estimates for this purpose. The estimations obtained with the invention give more current data including thermal effects and eliminate separate ground calibration tests.

In obtaining the estimates, the phase measurements and calibrated parameters of baseline vectors and line-biases to be used are related in the "Attitude Master Equation" as follows:

$$\Delta \phi ij = Si^T A^T Xj - kij + \beta j + Vij,$$

where:

$\Delta \phi ij$ = the Differential Phase Measurement with respect to the Reference or Master Antenna signal;

i = GPS Channel, 1, 2, ..., 9;

j = Antenna Baselines, 1, 2, 3;

$Si^T$ = the GPS Satellite Line of Sight (LOS) vector in Earth Fixed Earth Centered, ECEF, coordinates;

$A^T$ = the Transformation Matrix, ECEF from Body Coordinates;

Xj = the Antenna Baseline Vector in Body Coordinates;

kij = the Differential Integer Ambiguity;

βj=the Differential Line-Bias or electrical path length; and

Vij=the Phase Measurement Noise.

The Differential Range Measurement is the distance in the direction of the wave front of the slave from the Reference or Master Antenna, i.e.,:

$$\Delta rij = Si^T A^T Xj = \Delta\varphi ij + kij - \beta j.$$

An alternate state space formulation of this Attitude Master Equation, as set forth in the above-noted technical paper by D. KNIGHT, is:

$$\theta i = Hi\ x - ni + \epsilon i,\ i=1\ldots m$$

$$\theta = H\ x - n + \epsilon$$

$$x = [a\ /\ b]\ \text{or transpose}\ |a\ b|,\ H = |Losi\ 1|$$

where:

θ=Carrier phase measurement;

H=Observation matrix;

x=State, typically antenna position and clock bias;

n=the integer combination, one per satellite and there are m satellites, numbered i=1 ... m, with each ni=from 1. . . to m representing a carrier cycle integer and associated uncertainty bounds;

εi=phase measurement error with an assumed Gaussian probability distribution and variance Ri;

a=antenna position;

b=clock bias or electrical path length; and

LOS=line-of-sight, the direction of incident signal arrival.

All units of distance, phase, and time are in carrier wavelengths.

Viewing x and n as parameters to be adjusted, the measured phases, θi, are then independent random variables, and the joint probability density of θ is the product of the individual densities. Evaluating the joint probability density of θ:

$$p(\theta) = p(\theta 1)\ p(\theta 2)\ p(\theta 3) \ldots p(\theta m)$$

$$p(\theta i) = (1/(2\pi Ri)^{0.5})\ exp-[(\theta i - Hi\ x + ni)^2/2Ri]$$

The log-likelihood function is:

$$ln\ p(\theta) = \Sigma(i=1\ \text{to m}) - 1/2\ ln(2\pi Ri) - 1/2\ (\theta i - Hi\ x + ni)^2/Ri$$

and p(θ) is maximized when,

W=Σ (i=1 to m) (θi−Hi x+ni)^2/Ri is minimized. W is the "weighted fit error", the sum squared of discrepancies between predicted and actual measurements, weighted by measurement variances. The maximum-likelihood estimate is the (x, n) that minimizes W, and thus is the one sought as the most accurate in evaluating the line-biases.

Using the relationships expressed in the foregoing equations with the GPS and other measurement data obtained with the invention, improved attitude determination can be achieved.

DETAILED DESCRIPTION OF THE PREFERRED EMBODIMENT

Figure 1:
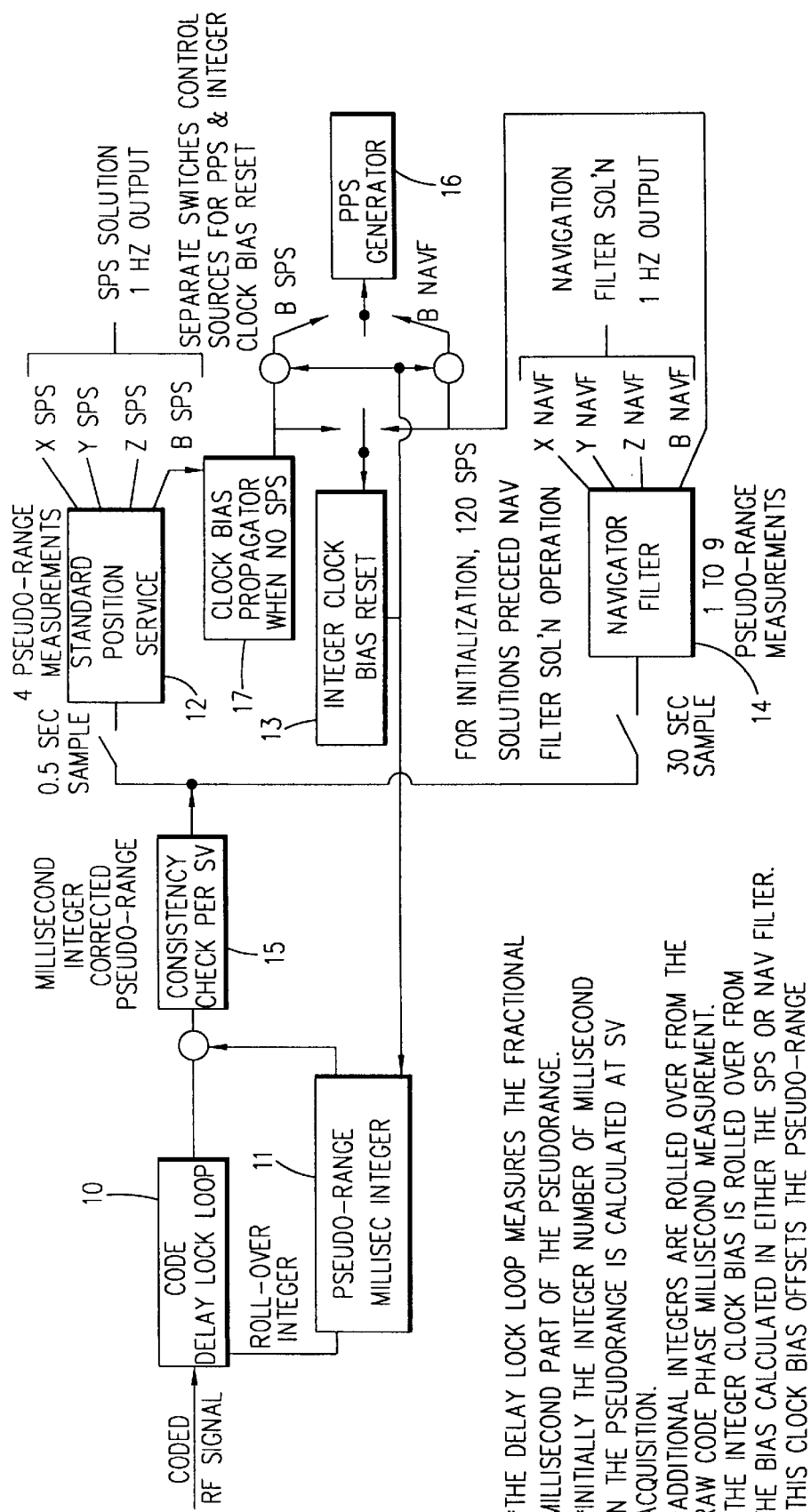
FIG. 1 is a flow diagram illustrating a navigation solution flow in a GPS Attitude Receiver for spacecraft resulting in x, y, z, and b parameters for processing in accordance with the present invention.

The present invention is directed to significantly extending the usefulness of systems for accomplishing attitude determination based on signals from the Global Positioning System (GPS) and embodies a method and means for this purpose which use and improve upon an approach similar to that described in the above-noted technical paper 1) of D. KNIGHT, "A New Method of Instantaneous Ambiguity Resolution", and provide a GPS Attitude Receiver achieving accurate estimates of line-biases, as will be understood from the following detailed description.

To begin with, an example of a current advanced aerospace qualified GPS receiver in which preferably the present invention may be implemented is the "GPS TENSOR™" (TM of the assignee of the present application), such as disclosed in the above-noted article 6) by present co-inventor R. A. FULLER, and others, entitled "Spacecraft Guidance and Control with GPS Tensor", which article is incorporated herein by reference. Updated information thereon is disclosed in another article by the present co-inventors, and others, entitled "GPS Tensor, An Attitude and Orbit Determination System for Space", R. FULLER, D. HONG, S. HUR-DIAZ, J. RODDEN, M. TSE, presented at the Institute of Navigation 10th International Technical Meeting, ION GPS-97, Sep. 16–19, 1997, Kansas City, Mo., which article is also herein incorporated by reference. The GPS TENSOR™ generates navigation position/velocity data, precision timing signals, and 3 axes of spacecraft attitude, utilizing 9 channels, and is particularly suited for use with the "GLOBALSTAR™" (TM of Globalstar, Inc.) communication satellite constellation presently in the process of being implemented. The operation of this receiver starts with a coded RF signal from the sum of the present 25 GPS Satellite Vehicles (SVs) in a constellation in orbit at about 20,000 km, half synchronous altitude. The first step in processing is to measure "pseudoranges" between the spacecraft or satellite carrying the receiver and the GPS SVs. The pseudorange is the time delay or "distance" between the time a signal is sent from a GPS SV and the time of its receipt by the spacecraft receiver plus the clock bias offset of the receiver clock, i.e., the actual transmission time, which is indicative of true geometrical distance between the SV and receiver at the time of signal transmission plus the effect of the receiver clock bias.

The pitch, roll, and yaw attitude, θ, φ, ψ, determination approach of the invention, follows from and improves upon that first developed by the above-mentioned Dr. C. COHEN of Stanford University, and disclosed in technical paper 2). In contrast to the fixed calibration of COHEN, with the present invention it is necessary for its operation that navigation calculations be available and in progress. These attitude calculations use signals from an SV received by multiple antennas on the spacecraft, although in actuality the navigation function only requires one antenna. In fact, a Master Antenna is designated from among the multiple antennas for pseudorange determination, and re-designation is provided for switching to another antenna upon changes in the signal to noise ratios (SNRs) on the tracking channels. The GPS TENSOR™, of the preferred embodiment, nominally uses signals from 4 rectangularly arrayed antennas to determine attitude. The signals are RF signals received at all of the antennas from each SV and from which signals differential phase measurements Δφij are derived. Several SV signals are required. The slight phasing differences of signals arriving at different times from different sources at the different antennas provide the basis for determining the attitude of the spacecraft with respect to the local reference frame.

The attitude calculations presently used need some data base parameters called "Self Survey Data". These include the vector distances between the antennas and the designated Navigation Master Antenna, called "baselines", and the electrical phase losses or "line-biases" in the cable lengths from the antennas to the receiver. The original attitude system used to implement the approach first developed by Dr. Clark COHEN, noted above, required a special measurement process for determining these parameters that took several hours with the fully configured (antenna—cable—receiver) system collecting RF data from GPS SVs (see Dr. COHEN's U.S. Pat. No. 5,548,293, issued Aug. 20, 1996, for "System and Method for Generating Attitude Determinations using GPS").

This system was originally applied in aircraft which could be parked on a runway for the required measurement periods. However, the application of this Self Survey Data collection method in the production of the GLOBALSTAR™ satellites was prohibitively difficult since, although the vector baselines could be found from the mechanical positions of the antennas, no off-line measurements of each of the line-biases were available.

In addition to the difficulty of predetermining the line-biases, the expectation of significant temperature variability of the line-biases in orbiting GLOBALSTAR™ satellites motivated the development of a system and software that could estimate the line-biases concurrently with the flight operation. This development has led to the present invention as will now be described.

Attitude determination from GPS measurements generally may be obtained by an interactive solution of the "Attitude Master Equation" with RF differential phase measurements and calibrated parameters of baseline vectors and line-biases. In obtaining the estimates, the phase measurements and calibrated parameters of baseline vectors and line-biases to be used are related in the "Attitude Master Equation" as follows:

$$\Delta \phi ij = Si^T A^T Xj - kij + \beta j + Vij,$$

where:
$\Delta \phi ij$=the Differential Phase Measurement with respect to the Reference or Master Antenna signal;
i=GPS Channel, 1, 2, . . . , 9;
j=Antenna Baselines, 1, 2, 3;
$Si^T$=the GPS Satellite Line of Sight (LOS) vector in Earth Fixed Earth Centered, ECEF, coordinates;
$A^T$=the Transformation Matrix, ECEF from Body Coordinates;
Xj=the Antenna Baseline Vector in Body Coordinates;
kij=the Differential Integer Ambiguity;
$\beta$j=the Differential Line-Bias or electrical path length; and
Vij=the Phase Measurement Noise.
The Differential Range Measurement is the distance in the direction of the wave front of the slave from the Master Antenna, i.e.,:

$$\Delta rij = Si^T A^T Xj = \Delta \phi ij + kij - \beta j.$$

While the baselines can be readily determined mechanically, line-biases require special calibration since line-biases in orbital operation are on a nearly continuous basis. It is this calibration which the present invention is designed to generate. The estimation obtained with the invention gives more current data with thermal effects and eliminates separate ground calibration tests.

More particularly, an alternate state space formulation of this Attitude Master Equation, as set forth in the above-noted technical paper 1) by D. KNIGHT, is as follows:

$$\theta i = Hi\ x - ni + \epsilon i,\ i = 1 \ldots m$$

$$\theta = H\ x - n + \epsilon$$

$$x = [a/b]\ \text{or transpose}|a\ b|,\ H = |LoSi\ 1|$$

where:
$\theta$=Carrier phase measurement;
H=Observation matrix;
x=State, typically antenna position and clock bias;
n=the integer combination, one per satellite and there are m satellites, numbered i=1 . . . m, with each ni=from 1. . . to m representing a carrier cycle integer and associated uncertainty bounds;
$\epsilon i$=phase measurement error with an assumed Gaussian probability distribution and variance Ri;
a=antenna position;
b=clock bias or electrical path length; and
LOS=line-of-sight, the direction of incident signal arrival.
All units of distance, phase, and time are in carrier wavelengths.

Viewing x and n as parameters to be adjusted, the measured phases, $\theta i$, are then independent random variables, and the joint probability density of $\theta$ is the product of the individual densities. Evaluating the joint probability density of $\theta$:

$$p(\theta) = p(\theta 1)\ p(\theta 2)\ p(\theta 3) \ldots p(\theta m)$$

$$p(\theta i) = (1/(2\pi Ri)^{0.5}) \exp[-(\theta i - Hi\ x + ni)^2 / 2Ri]$$

The log-likelihood function is:

$$\ln p(\theta) = \Sigma(i=1\ \text{to}\ m) - 1/2\ \ln(2\pi Ri) - 1/2\ (\theta i - Hi\ x + ni)^2 / Ri$$

and $p(\theta)$ is maximized when,
$W = \Sigma(i=1\ \text{to}\ m)\ (\theta i - Hi\ x + ni)^2 / Ri$ is minimized. W is the "weighted fit error", the sum squared of discrepancies between predicted and actual measurements, weighted by measurement variances. The maximum-likelihood estimate is the (x, n) that minimizes W, and thus is the one sought as the most accurate in evaluating the line-biases. This problem formulation is presented in, D. KNIGHT, U.S. Pat. No. 5,296,861, issued Mar. 22, 1994.

The preceding problem statement has been used previously for the determination of the integer number of cycles, ni, with known electrical path length measurements. The process implies a dedicated measurement procedure for external determination on the electrical paths. The present invention expands the estimation process to include a self determination of the electrical path length which eliminates the need for external measurement procedures. In addition, the "real time" estimation automatically compensates for slowly varying electrical path lengths as might occur on a thermally varying spacecraft environment.

In applying the equation information in the GPS TENSOR™ it should be understood that there are two navigation solutions performed in the GPS TENSOR, i.e., the Standard Position Service (SPS) and the Navigation Filter (NF), as illustrated in the flow diagram of FIG. 1. As seen in the Figure, a Delay Lock Loop (DLL) 10 is provided to receive from an SV coded RF signals and measure fractional millisecond parts of the pseudoranges with the integer number of milliseconds in a pseudorange being initially calculated upon SV signal acquisition. Both the pseudorange and clock bias values are divided into terms comprising integer millisecond distances, e. g., 300 km, plus a fractional millisecond segment. Additional integers are rolled over, from the raw Code Phase millisecond measurement, each time the fractional millisecond exceeds an integer, and are input at 11. The integer clock bias is similarly reset and rolled over at 13 from the bias calculated in either the Standard Position Service (SPS) 12 or the Navigation Filter (NF) 14 and this clock bias is used at 11 to offset the pseudorange measurement data that goes into both the SPS and NF calculations through the consistency check at 15 which passes the millisecond integer corrected pseudorange. The NF 14 computations have an independently determined bias estimate so that the NF bias value is incremented at the same time the adjustment is made to the SPS 12 computations to keep its clock bias consistent with the adjusted pseudorange measurements and vice-versa. The GPS time reference is the standard throughout the network for communications systems such as the GLOBALSTAR satellites. The SPS 12 numerically solves for the 4 unknowns, i.e., the x-y-z positions and the clock bias b, using 4 pseudorange measurements. This Service (SPS) 12 is subject to position calculation outages and without these 4 measurements no SPS solution is possible. The alternate navigation solution involving the Navigation Filter 14 algorithm uses individual pseudorange measurements to adjust a continuous running dynamic model of the 4 system position parameters, x-y-z and clock bias b, and their derivatives. The Navigation Filter 14 can use up to all 9 measurement channels available in the GPS TENSOR. It also will generate an estimate of the position parameters, even in the event of short term absences of new pseudorange inputs, based on dynamic extrapolation of the preceding operation. The NF 14 operation requires an initialization period of several orbits for its parameters to converge to the proper solution, e.g., 120 SPS solutions, and it estimates 9 states, i.e., 3 position, 3 velocity, and clock bias, bias rate of change, and bias acceleration. Once the parameters are converged, the NF solution is more accurate than the SPS solution since it continually averages more data. The NF solution is also more robust since it doesn't suffer outages when there are less than 4 SVs available for processing. The interaction of these two solutions in conditioning the pseudorange input data may be dealt with by the melding of the integer millisecond roll-over from the Code Delay Lock Loop (DLL) 10 with the millisecond resets and the Pulse Per Second (PPS) output generated at 16 from the clock bias part 17 of the navigation solution. The PPS output at 16 is more robust with the NF solution than with the SPS solution since, as noted, the latter is more susceptible to outages. For satellite systems, such as GLOBALSTAR, the precision timing signal of the PPS output 16 is critical. There are separate output pins for these pulses which are produced at a 1 second interval accurate to a microsecond. The entire network of GLOBALSTAR communication frequencies are locked onto the "universal" GPS Time as detected and regenerated by the GPS TENSOR. The generation of the PPS is based on the clock bias parameter of the navigation calculations. The GPS TENSOR operates such that the default selection of the NF calculated clock bias is used for PPS generation. The system position parameters x-y-z are used in a GPS attitude processing algorithm in accordance with the present invention.

Figure 2:
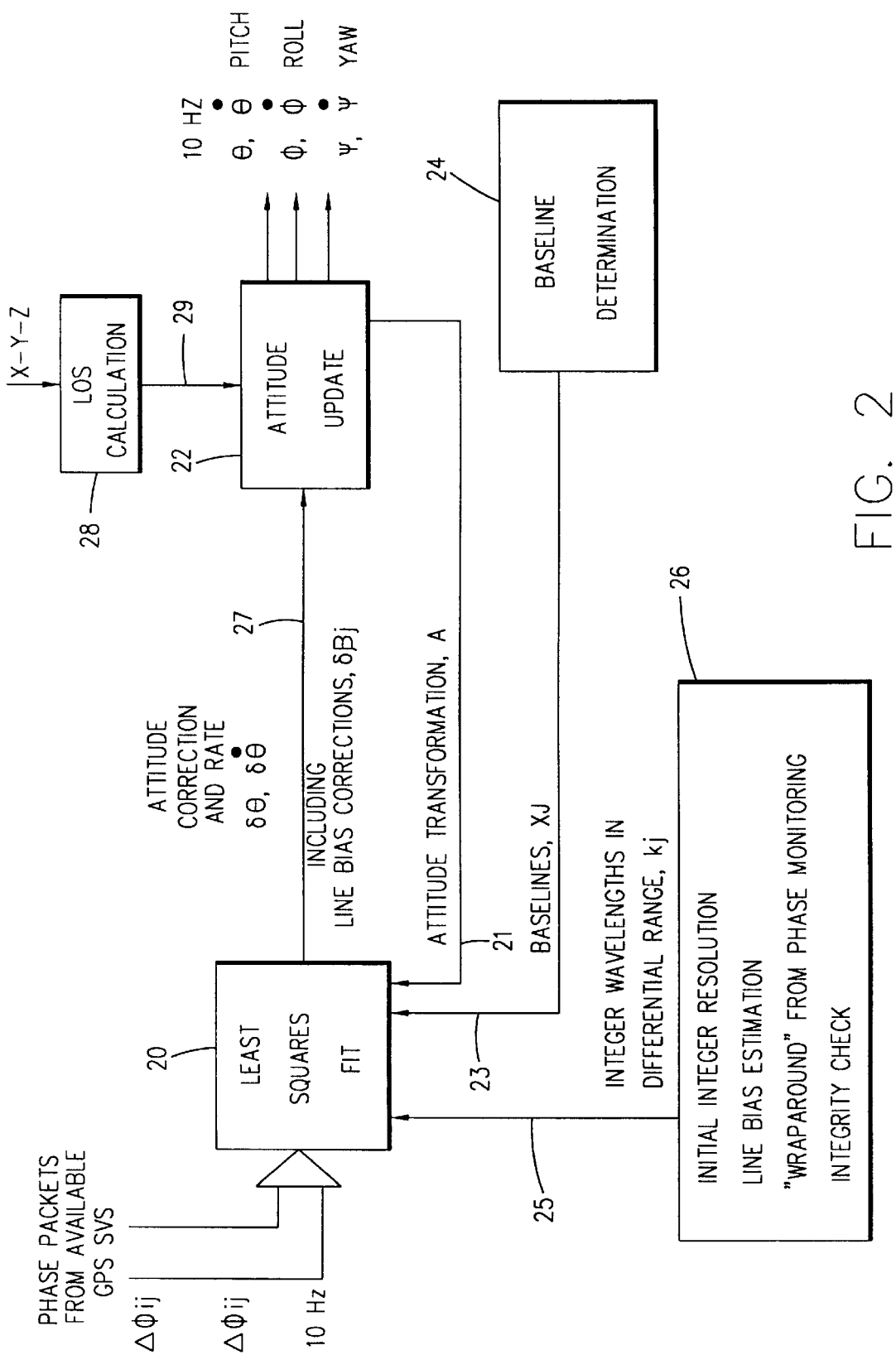
FIG. 2 is an illustrative diagram of a GPS attitude processing algorithm in accordance with the invention.

An illustrative diagram of a GPS attitude processing algorithm in accordance with the invention is shown in FIG. 2. Multiple phase measurements, derived from multiple wavelength signals received from a number of available GPS SVs, are input at a rate of 10 Hz from the antennas, in the form of differential phase measurements $\Delta\phi_{ij}$ and rate measurements $\Delta\phi^*_{ij}$, and subjected to a weighted least squares fit at a node 20, using the "weighted fit error" W. Node 20 also receives an input 21, indicative of attitude transformation A after an attitude update processing at node 22, a baselines $X_j$ input 23 after a baseline determination at node 24, and an integer wavelengths in the differential range $k_{ij}$ input 25, which wavelenghts are derived at node 26 from factors such as an initial integer resolution, line bias estimation, "wraparound" from phase monitoring, and an integrity check. The least squares fit at 20 outputs an indication 27 of attitude correction and rate, e.g., for pitch, $\delta\Theta$, $\delta\Theta^*$, which includes a line bias correction $\Delta\beta_j$. Indication 27 is input for attitude update processing at 22 along with an input 29 representing an LOS calculation at node 28 using the x-y-z parameters from the solution flow in FIG. 1, which results in the desired pitch, roll, and yaw attitude and rate determinations, $\Theta$, $\Theta^*$, $\phi$, $\phi^*$, $\psi$, $\psi^*$.

Figure 3:
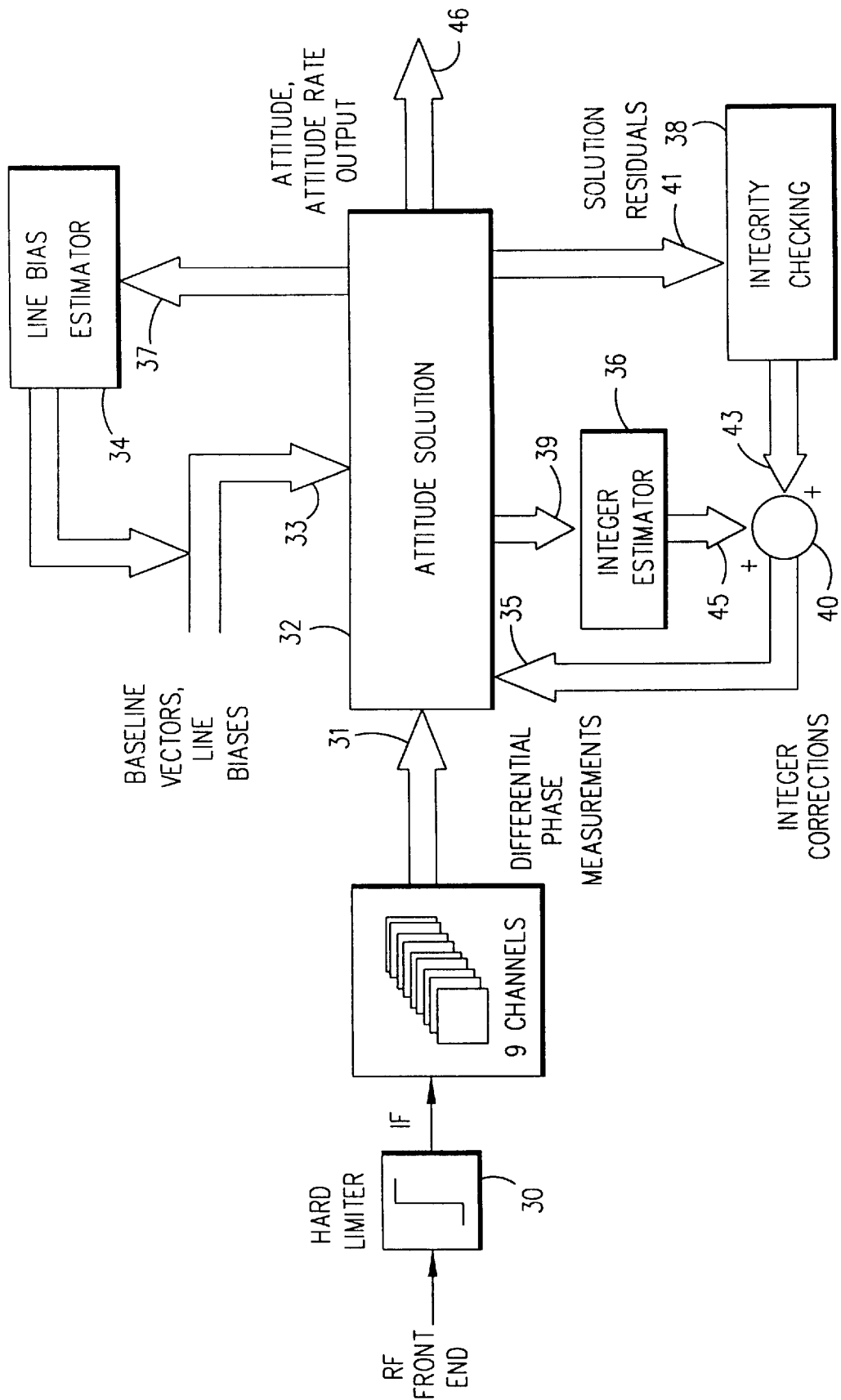
FIG. 3 illustrates an attitude algorithm processing architecture for implementing the algorithm of FIG. 2.

An appropriate attitude algorithm processing architecture for implementing the present invention is shown in FIG. 3. The received RF GPS signals are passed through a hard limiter 30 and converted or coded into IF signals which are input, e.g., to 9 channels, to produce the differential phase and rate measurements $\Delta\phi_{ij}$ and $\Delta\phi^*_{ij}$ input to node 20 in FIG. 2.

These $\Delta\phi_{ij}$ and $\Delta\phi^*_{ij}$ measurements are input at 31 to an attitude solution unit 32, essentially functioning as nodes 20 and 22, which also receives an input 33 indicative of baseline vectors and line biases, and an input 35 indicative of integer corrections. The attitude solution unit 32 provides feedback outputs to modify the inputs 33 and 35, i.e., one output 37 to a line bias estimator unit 34 having an output that is added to the baseline vector and line bias input 33, another output 39 to an integer estimator unit 36, and a solutions residuals output 41 to an integrity checking unit 38. The output 43 of the integrity checking unit 38 is supplied, along with the output 45 from the integer estimator unit 36, to an adder 40 that provides the integer corrections input 35 to attitude solutions unit 32. In response to the inputs at 31, 33, and 35, the attitude solution unit 32 provides an output 46 indicative of attitude and attitude rate, $\Theta$, $\Theta^*$, $\phi$, $\phi^*$, $\psi$, $\psi^*$, for pitch, roll, and yaw in keeping with the algorithm of FIG. 2.

It will accordingly be seen that a method and means have been described that significantly extends the usefulness of systems for accomplishing attitude determination based on the use of signals from the Global Positioning System (GPS). A system so adapted for attitude determination in a spacecraft is dependent only on electrical phase measurements coupled with input geometric input data. No separate prior measurement "Self Survey" procedure is required for determination of electrical path phase length. Electrical phase lengths need not be constant during operation.

What is claimed is:

1. A system for attitude determination in a spacecraft using GPS signals to obtain differential phase measurements and using concurrent line-bias estimates, comprising:

antenna means on the spacecraft, including a Master Antenna, for receiving GPS signals;

means, responsive to said received GPS signals, for performing a line of sight, LOS, calculation on the system position parameters, x-y-z, derived from said received GPS signals, and producing LOS signals indicative thereof;

update means, responsive to said LOS signals, for performing an attitude update processing and producing an attitude transformation signal, A;

baseline means for determining the baseline geometry of the locations of said antenna means and producing signals indicative of the baselines, Xj;

means for producing signals indicative of integer wavelengths in the differential range, kij, derived from factors comprising initial integer resolutions, line bias estimations, "wraparound" from phase monitoring, and an integrity check;

means, responsive to GPS signals received by said antenna means, for producing signals indicative of differential phase measurements, $\Delta\phi ij$;

means, responsive to said differential phase measurements, $\Delta\phi ij$, for producing attitude correction and attitude rate correction signals, $\delta\Theta$, $\delta\Theta^*$, $\delta\phi$, $\delta\phi^*$, $\delta\psi$, $\delta\psi^*$, including a line bias correction $\Delta\beta j$, said means comprising:

means for performing a weighted least squares fit, using "weighted fit error" W derived from the "Attitude Master Equation", on signals input thereto including:
said differential phase measurements signals, $\Delta\phi ij$;
said attitude transformation signal, A;
said baseline signals, Xj; and
said signals indicative of integer wavelengths in the differential range, kij; and
for producing said line bias correction $\Delta\beta j$ to provide a concurrent line bias estimate; and means for inputting said attitude correction and attitude rate correction signals, $\delta\Theta$, $\delta\Theta^*$, $\delta\phi$, $\delta\phi^*$, $\delta\psi$, $\delta\psi^*$, including a line bias correction $\Delta\beta j$, to said update means for combining with said LOS signals, to obtain an output indicative of attitude and attitude rate in pitch, roll, and yaw, $\Theta$, $\Theta^*$, $\phi$, $\phi^*$, $\psi$, $\psi^*$, using concurrent line-bias estimates.

2. A system as in claim 1 further comprising a plurality of tracking channels for receiving said GPS signals and means for selecting said Master antenna from among said antenna means based on the signal to noise ratios (SNRs) on the tracking channels.

3. A system as in claim 1 further comprising means for minimizing said "weighted fit error" W.

4. A method for attitude determination in a spacecraft using GPS signals to obtain differential phase measurements from which concurrent line-bias estimates are derived, comprising the steps of:

receiving GPS signals with a plurality of antennas on the spacecraft, including a Master Antenna;

producing differential phase measurement signals, $\Delta\phi ij$, in response to said received GPS signals;

deriving system position parameters, x-y-z, from said received GPS signals and performing a line of sight, LOS, calculation on said position parameters, x-y-z, and producing LOS signals indicative thereof;

in response to said LOS signals, performing an attitude update and producing an attitude transformation signal, A;

determining the baseline geometry of the locations of said antennas and producing signals indicative of the baselines, Xj;

producing signals indicative of integer wavelengths in the differential range, kij, derived from factors comprising initial integer resolutions, line bias estimations, "wraparound" from phase monitoring, and an integrity check;

performing a weighted least squares fit, using "weighted fit error" W derived from the "Attitude Master Equation", on said differential phase measurement signals, $\Delta\phi ij$, said attitude transformation signal, A, said baseline signals, Xj, and said signals indicative of integer wavelengths in the differential range, kij, and producing a line bias correction $\Delta\beta j$ to provide a concurrent line bias estimate;

applying said line bias correction $\Delta\beta j$ to said differential phase measurement signals, $\Delta\phi ij$, and producing attitude correction and attitude rate correction signals, $\delta\Theta$, $\delta\Theta^*$, $\delta\phi$, $\delta\phi^*$, $\delta\psi$, $\delta\psi^*$, including said line bias correction $\Delta\beta j$; and combining said LOS signals with said attitude correction and attitude rate correction signals, $\delta\Theta$, $\delta\Theta^*$, $\delta\phi$, $\delta\phi^*$, $\delta\psi$, $\delta\psi^*$, and producing an output indicative of attitude and attitude rate in pitch, roll, and yaw, $\Theta$, $\Theta^*$, $\phi$, $\phi^*$, $\psi$, $\psi^*$, with concurrent line-bias estimates.

5. A method as in claim 4 wherein sai.d GPS signals are received on a number of tracking channels and said Master Antenna is designated from among the plurality of antennas based on the signal to noise ratios (SNRs) on the tracking channels.

6. A method as in claim 4 wherein said "weighted fit error" W is minimized.

7. A GPS attitude receiver in a spacecraft for determining spacecraft attitude using GPS signals to obtain differential phase measurements and using concurrent line-bias estimates, comprising:

means on the spacecraft for receiving GPS signals from a plurality of spacecraft antennas, including a Master Antenna, for receiving GPS signals;

means for deriving spacecraft position parameters, x-y-z, from said received GPS signals;

means for performing a line of sight, LOS, calculation on said spacecraft position parameters, x-y-z, and producing LOS signals indicative thereof;

update means, responsive to said LOS signals, for performing an attitude update processing and producing an attitude transformation signal, A;

baseline means for determining the baseline geometry of the locations of said plurality of antennas and producing signals indicative of the baselines, Xj;

means for producing signals indicative of integer wavelengths in the differential range, kij, derived from factors comprising initial integer resolutions, line bias estimations, "wraparound" from phase monitoring, and an integrity check;

means, responsive to the GPS signals received, for producing signals indicative of differential phase measurements, $\Delta\phi ij$;

means, responsive to said differential phase measurements, $\Delta\phi ij$, for producing attitude correction and attitude rate correction signals, $\delta\Theta$, $\delta\Theta^*$, $\delta\phi$, $\delta\phi^*$, $\delta\psi$, $\delta\psi^*$, including a line bias correction $\Delta\beta j$, said means comprising:

means for performing a weighted least squares fit, using "weighted fit error" W derived from the "Attitude Master Equation", on signals input thereto including:
said differential phase measurements signals, $\Delta\phi ij$;

said attitude transformation signal, A;
said baseline signals, Xj; and
said signals indicative of integer wavelengths in the differential range, kij; and
for producing said line bias correction $\Delta\beta j$ to provide a concurrent line bias estimate; and means for inputting said attitude correction and attitude rate correction signals, $\delta\Theta$, $\delta\Theta^*$, $\delta\phi$, $\delta\phi^*$, $\delta\psi$, $\delta\psi^*$, including a line bias correction $\Delta\beta j$, to said update means for combining with said LOS signals, to obtain an output indicative of attitude and attitude rate in pitch, roll, and yaw, $\Theta$, $\Theta^*$, $\phi$, $\phi^*$, $\psi$, $\psi^*$, using concurrent line-bias estimates.

8. A receiver as in claim 7 further comprising a plurality of tracking channels for receiving said GPS signals and means for selecting said Master antenna from among said antenna means based on the signal to noise ratios (SNRs) on the tracking channels.

9. A receiver as in claim 7 further comprising means for minimizing said "weighted fit error" W.

* * * * *